United States Patent [19]

Clark

[11] 3,760,505
[45] Sept. 25, 1973

[54] TRACING DEVICE
[75] Inventor: Earl D. Clark, Bryan, Ohio
[73] Assignee: The Ohio Art Company, Bryan, Ohio
[22] Filed: Nov. 17, 1971
[21] Appl. No.: 199,493

[52] U.S. Cl................................. 33/18 R, 33/1 M
[51] Int. Cl............................................. B43l 13/00
[58] Field of Search...................... 346/21; 161/192; 220/82; 33/18 R, 1 M, 23 C

[56] References Cited
UNITED STATES PATENTS
3,055,113  9/1962  Grandjean........................... 33/18 R
2,543,561  2/1951  Tracy................................... 33/18 R
3,170,383  2/1965  Hunt..................................... 220/82 R
2,828,625  4/1958  Morphis et al...................... 220/82 R
3,307,400  3/1967  Leroy.................................... 73/331
2,279,145  4/1942  Ryan.................................... 161/192

Primary Examiner—Harry N. Haroian
Attorney—Hugh Adam Kirk

[57] ABSTRACT

An improved case for the tracing device shown in Grandjean U.S. Pat. No. 3,055,113 issued Sept. 25, 1962, including a protective plastic sheet covering its glass tracing surface, a non-hardening adhesive between the glass surface and the inner liner or side wall support therefor including a groove for said adhesive to prevent leakage of powder from inside the device, integral inwardly extending bosses on said inner liner for holding the axles of the pulleys for operating the tracing mechanism in their proper locations, and annular recesses or seats for washers around the apertures in said inner liner through which the knobs extend for operating the pulleys to further seal the escape of powder from inside the device.

1 Claim, 7 Drawing Figures

INVENTOR.
EARL D. CLARK

BY *Hugh A Kirk*

ATTORNEY

PATENTED SEP 25 1973 3,760,505
SHEET 2 OF 2
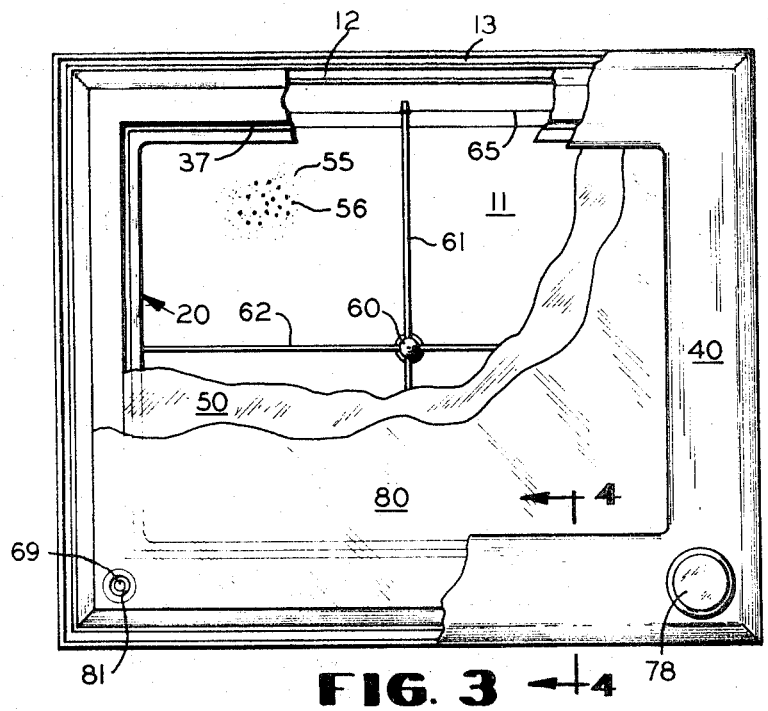
FIG. 3
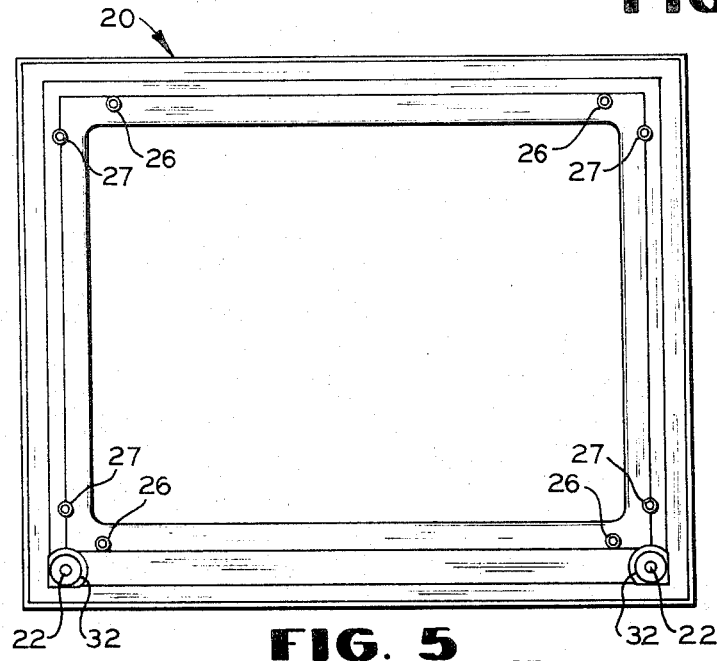
FIG. 5
FIG. 7
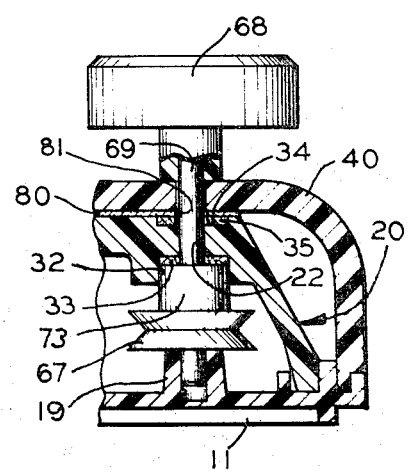
FIG. 4
FIG. 6
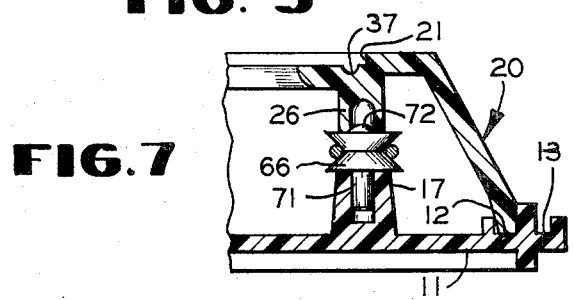
INVENTOR.
EARL D. CLARK
BY Hugh A. Kirk
ATTORNEY

TRACING DEVICE

BACKGROUND OF THE INVENTION

Previously it has been a major problem in the production of the tracing device shown in the above mentioned Grandjean patent to seal the fine metallic powder within the box, particularly when the tracing surface is of glass and the box is of another material such as plastic. Furthermore, there have been problems regarding loosening of the pulleys from their journalled mountings in the base of the box, thus casuing slipping of the tracing mechanism and even inoperability thereof.

Since the tracing surface of the Grandjean et al device is of glass, there is the remote possibility that the device may be dropped and the glass broken which could produce dangerous splinters that would harm or cut a person nearby.

SUMMARY OF THE INVENTION

Generally speaking, the tracing device shown in the above mentioned Grandjean patent comprises a fluid tight box having a base and side walls or inner liner made of platic, such as polystyrene, a transparent tracing surface comprising a glass plate covering the top of the box, and a plastic frame or cover for holding the plate against the walls of the box and to the base. Inside the box there is placed a fine metallic powder which will coat the inner surface of the transparent glass top or plate to render it opague. Then also inside the box there is a stylus or courser which presses against this inner surface of the glass plate and scrapes the powder therefrom to produce a line, including a mechanism for operating this stylus comprising a pair of orthogonally movable rods, the ends of which are connected to strings that pass around pulleys journalled inside the box. At least one of the pulleys connected to the string of each orthogonally movable rod has a shaft which projects through the box usually adjacent the transparent top for a knob for operating the pulleys. Thus by rotating the two knobs at different speeds and in different directions the stylus or courser may be caused to draw lines, designs, write, or the like on the inner surface of the transparent top plate. When the design and lines are to be removed the box is then tilted upside down and shaken so that the powder again will cover the places where it has been scraped off of the plate. In order to facilitate the powder and its even distribution of the inner surface of the glass plate, there may be provided together therewith small plastic balls or beads inside the box. The powder employed usually is a metallic powder, such as aluminum.

The improved features of this invention for the tracing device include means to prevent the escape of this metallic powder from inside the box. One such means comprises a groove in the inner liner adjacent the peripheral edge of the glass plate, which groove is filled with a non-hardening adhesive to maintain with age the seal between the plastic liner and the edge of the glass plate. Another such means comprises annular recesses around both ends of the apertures in the inner liner through which the shafts for the knobs project, which recesses retain washers, such as of felt. The lower washer is being held in place by the boss on the shaft for the knob and the upper washer is held in its annular recess or seat by the frame that holds the glass plate against adhesive in the groove in the inner liner and to the base of the box.

Between the glass plate and the frame there is also provided a transparent plastic film, such as of a polyester like polyethylene terephthalate, which will retain the glass plate within the box in the event it is broken. For locating and maintaining the position of this plastic safety film, there may be provided one or more apertures along its outer edge through which the shafts for the knobs project.

OBJECTS AND ADVANTAGES

Accordingly it is an object of this invention to produce an improved educational game or toy by which line pictures, designs and writing may be easily drawn and erased, which toy does not leak any of the powdered materials in which the lines are made.

Another object is to prevent any glass from escaping in the event the toy is dropped or the transparent glass tracing surface is broken, thus materially improving the safety of the toy or game for children.

BRIED DESCRIPTION OF THE VIEWS

The above mentioned and other features, objects and advantages and the manner of attaining them are described more specifically below by reference to an embodiment of this invention shown in the accompanying drawings, wherein:

FIG. 3 is a view similar to that shown in FIG. 1 but on a reduced scale for showing the plastic safety or protective sheet for covering the glass plate, and its location over the driving knobs;

FIG. 4 is an enlarged and expanded edge view taken along line 4 — 4 of FIG. 3 showing how the frame, plastic sheet, glass plate, inner liner, and base are assembled;

FIG. 5 is a bottom view of the inner liner shown in the previous figures, showing the bosses for holding the shafts of the pulleys in position and the recessed seats for washers around the shafts for the knobs;

FIG. 6 is an enlarged sectional view through one of the shafts of the knobs showing the recesses for the washers therearound; and FIG. 7 is an enlarged sectional view through one of the pulleys showing a boss on the inner liner for holding its axle and pulley in position against the supporting journal post for the pulley mounted on the base.

DETAILED DESCRIPTION OF THE PREFERRED EMBODIMENT

Figure 1:
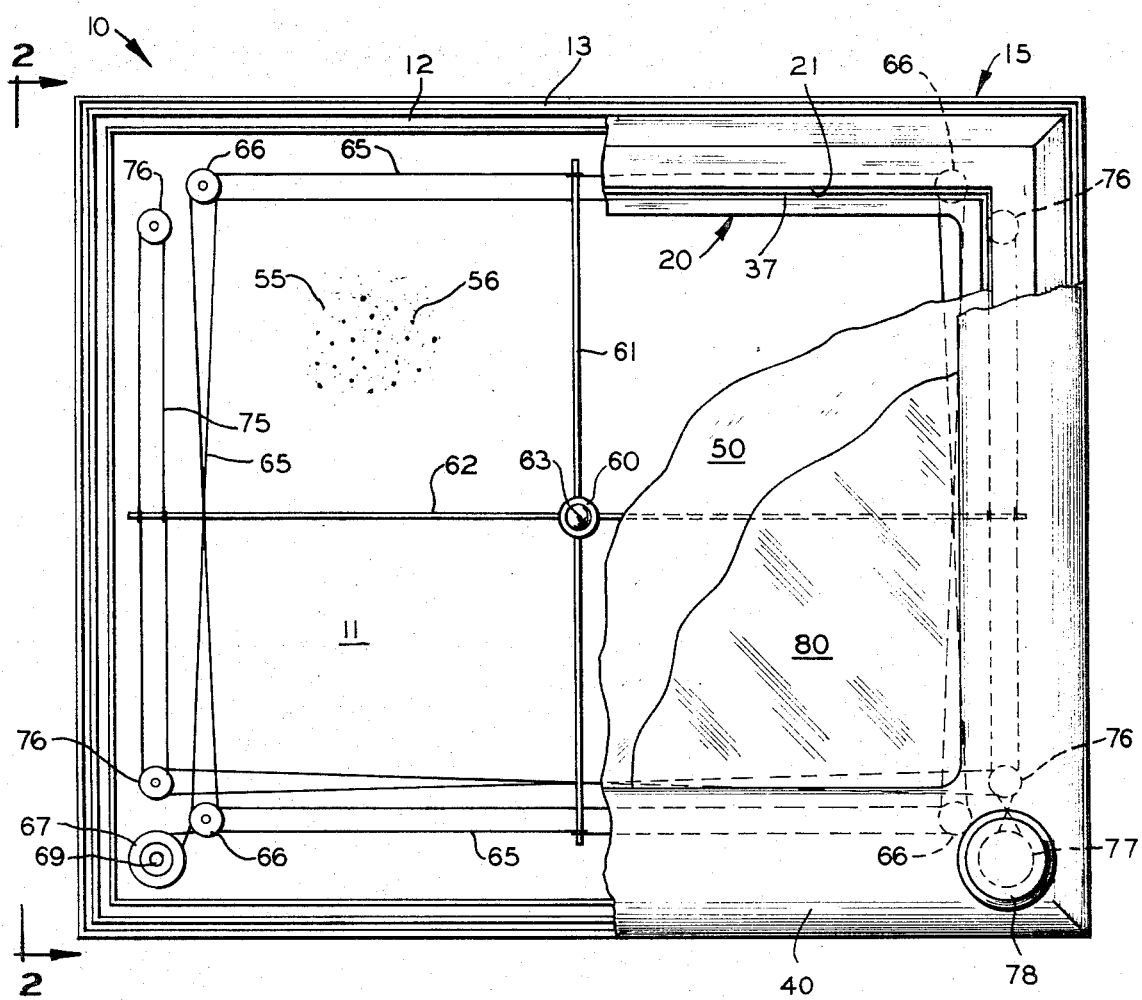
FIG. 1 is a plan view of the improved tracing device according to this invention with parts thereof broken away to show the mechanism for the operation thereof.
Figure 2:
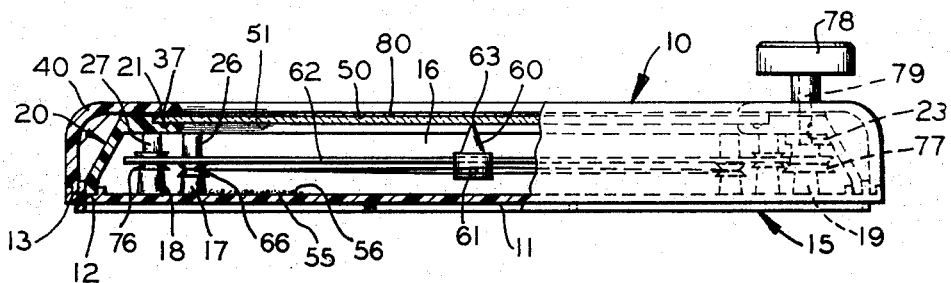
FIG. 2 is an end view of the device shown in FIG. 1 in the direction of arrow 2 — 2 with parts broken away to show the other features of the operating mechanism and parts of the device.

Referring primarily to FIGS. 1 and 2, the embodiment of the tracing device 10 shown therein comprises a rectangular base tray or plate 11 having peripheral grooves 12 and 13 into which the lower edges of the inner liner 20 and outer frame member 40 are sealed, either by an adhesive and/or fusion of these parts, if made of plastic such as polystyrene. Both the inner liner 20 and frame 40 have substantially L-shaped cross-sections and comprise telescoping or nesting rectangular frames. Between the inner edges of these two frames 20 and 40 and seated in a shoulder groove 21 in the inner liner 20, is a top transparent cover or plate 50 to complete a closed box 15 within which are the operating parts of the tracing device. This box 15 is thus composed of the base 11, inner liner 20 and transparent cover 50 having an inside tracking surface, all of which parts are sealed together to form a fluid tight chamber 16. Within this chamber 16 there is placed a small amount of a metallic powder 55 that may be mixed with small plastic beads 56, which mixture is shaken inside the chamber 16 without escaping therefrom, so that the powder coats the inner surface 51 of the transparent glass plate 50, particularly when the device is shaken in an upside-down position. This shaking also removes any marks or spaces that have been scraped clean of the powder by the stylus or courser 60, to cause the inner surface 51 to be completely opaque for further scratching thereon by the stylus 60.

The stylus, courser, or marker 60 shown in FIGS. 1, 2 and 3 slides along two orthogonal rods 61 and 62 which pass through apertures in the base of the stylus 60. The upper pointed end 63 of the stylus 60 is held against the surface 51 of the glass plate 50 by the tension in the strings 65 and 75 through the orthogonal rods 61 and 62, so as the stylus 60 is moved it will scratch the powder 55 that is adhered to the plate 50 from the plate to make the plate 50 transparent. This scratch appears as a black mark looking inside the dark sealed box, in contrast with the lighter color or grey of the powder which normally coats this surface 51. Opposite ends of the orthogonal rod 61 are connected to a continuous loop of thread or string 65 which is looped around pulleys 66 near the corners of the box under the overhanging flange of the inner liner, and also around a driving pulley 67 which is connected to an outer knob 68 (see FIG. 6) by means of a shaft 69 that extends through an aperture 22 in the inner liner 20. Similarly the orthogonal rod 62 has its outer ends connected to another thread 75 which is looped around separate corner pulleys 76 and a drive pulley 77 which is connected to an outer knob 78 by means of a shaft 79 that also extends through another aperture 23 in the inner liner 20. Thus by rotating the knobs 68 and 78 at different speeds and in different directions the stylus or courser 60 and its point 63 traces a line over the inner surface 51 of the transparent plate 50 to remove the opaque inner powder coating thereon.

The corner pulleys 66 and 76 are mounted on separate bosses 17 and 18, which usually are formed integral with the molded base 11 and have central apertures through which shaft pins 71 (see FIG. 7) with heads 72 hold the pulleys in the bosses 17 and 18. Similarly bosses 19 are provided in two of the corners for journalling the drive pulleys 67 and 77 (see also FIG. 6). In order to prevent loosening of the shaft pins 71 there is provided inwardly extending bosses 26 and 27 from inside of the inner liner memer 20 (see FIG. 7) for holding the heads 72 of these pins 71 and the pulleys 66 and 76 in position and prevent them from any loosening or working out of their journalled bosses 17 and 18 on the base 11.

Referring now more specifically to FIG. 6, the driving pulley 67 or 77 mounted on the integral boss 19 is shown to have a hub portion 73 which journals in an annular recess 32 provided on the inside of the liner 20, which recess 32 is sufficiently deep to include gasket or washer 33 which may be made of felt, and seals the powder 55 from escaping through the aperture 22 or 23. The inner liner 20 also at the other end of the aperture 22 or 23 is provided with a similar annular recess 34 for an additional washer or felt gasket 35 that is held in place by the under side of the outer frame member 40 to further seal any powder from escaping along the shaft 69 or 79 from the inside of the box or chamber 15.

The inner liner 20 may also be provided with an additional groove 37 in one side of its shoulder groove or offset 21 which extends clear around the inside of this offset 21 and opens against the inner surface 51 of the glass plate 50. This groove 37 is filled with a nonhardening adhesive 38 which adheres both to the glass 50 and to the plastic of the inner liner 20, and does not get hard, brittle, or crack with age so as continuously form a fluid tight seal between the glass 50 and the inner liner 20.

In order to prevent any particles of glass from the glass plate 50 from falling out of the box 15 in the event this plate 50 may be broken or shattered, there is provided a transparent plastic sheet 80 which completely covers the top of the box 15 and is held in place not only by the frame 40, but also by a pair of apertures 81 near the corners of the sheet 80 which surround the shafts 69 and 79 of the driving knobs. Thus if by accident the glass plate 50 is shocked sufficiently to cause it to break or crack, any particles of the glass will remain inside the chamber 16 of the box 15 and no sharp edges will escape to injure the user of the device.

It is understood that although the different parts of the device are made of plastic, and are sealed and/or adhered together, other materials may be used for the parts of this tracing device without departing from this invention.

Thus, while there is described above the principles of this invention in connection with specific apparatus, it is to be clearly understood that this description is made only by way of example and not as a limitation to the scope of this invention.

I claim:

1. In a tracing device comprising:
   a fluid tight box having a transparent glass top plate,
   a bottom, having integral upwardly extending bosses for holding the lower ends of shafts for pulleys,
   side walls having an inwardly extending flange for supporting said top plate,
   a frame around said side walls, anchored and sealed to said bottom and covering the outer edges of said top plate,
   powder in said box which can cover the inside surface of said top plate to make it opaque,
   a stylus movable in said box for scraping the powder from said surface to form a line,
   pulley means journalled in said box for strings for moving said stylus, and
   manual means projecting outside said box through said frame for operating said pulley means, the improvement in said side walls of said box comprising:
   integral inwardly extending bosses for holding the upper ends of the shafts for said pulleys,
   grooves in said flange adjacent the edges of said top plate for a nonhardening adhesive to seal said top plate to said side walls to prevent the escape of said powder, apertures in said flange having recesses for washers through which said manual means project outside said box, and said manual means having hub-portions for holding said washers in said recesses to prevent leakage of said powder from said box, and a further improvement in said device including a transparent plastic safety sheet covering said top plate having its edges under said frame and being held in place by a portion of the manual means that projects outside said box, said sheet retaining any parts of said glass top within said box in case said glass plate is broken.

* * * * *